Figure 1:
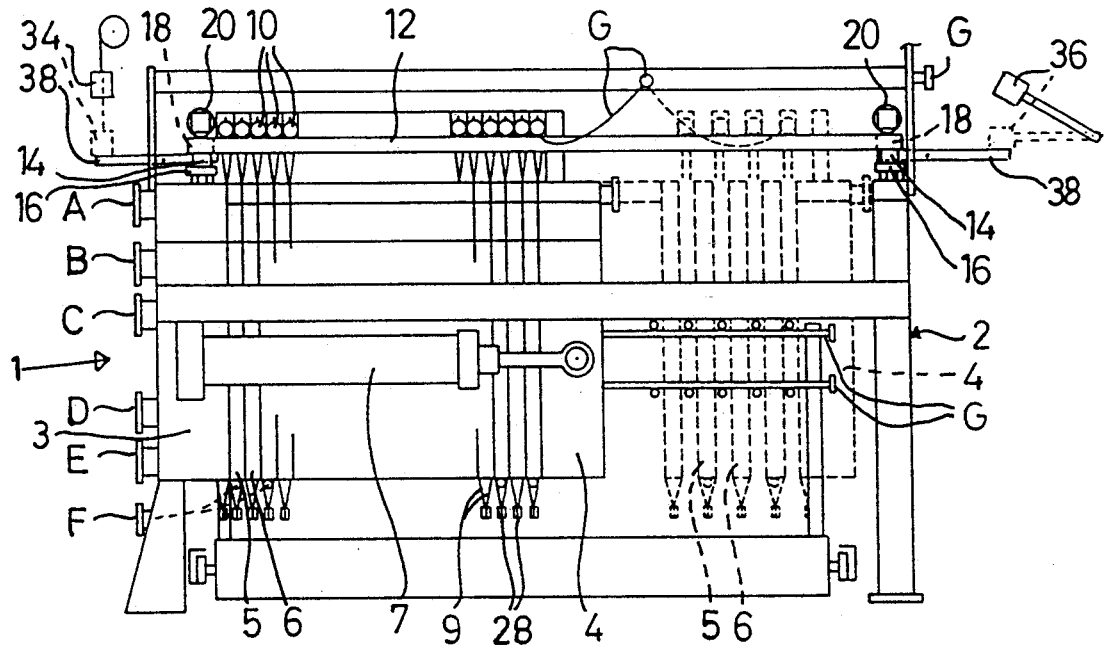

United States Patent [19]
Carlsson et al.

[11] Patent Number: 5,133,884
[45] Date of Patent: * Jul. 28, 1992

[54] METHOD FOR PRESSURE FILTERING AND DEVICE FOR CARRYING OUT SAME

[75] Inventors: Mats Carlsson, Morgongåva; Torbjörn Jönson, Sala, both of Sweden

[73] Assignee: Sala International AB, Sala, Sweden

[ * ] Notice: The portion of the term of this patent subsequent to Feb. 13, 2007 has been disclaimed.

[21] Appl. No.: 536,670
[22] PCT Filed: Dec. 13, 1988
[86] PCT No.: PCT/SE88/00676
§ 371 Date: Aug. 7, 1990
§ 102(e) Date: Aug. 7, 1990
[87] PCT Pub. No.: WO89/06155
PCT Pub. Date: Jul. 13, 1989

[30] Foreign Application Priority Data
Jan. 8, 1988 [SE] Sweden ................. 8800039

[51] Int. Cl.$^5$ ................. B01D 25/34
[52] U.S. Cl. ................. 210/791; 210/225; 100/198
[58] Field of Search ................. 210/225, 791; 100/198

[56] References Cited
U.S. PATENT DOCUMENTS
4,900,454 2/1990 Hedlund et al. ................. 210/770

FOREIGN PATENT DOCUMENTS

| | | |
|---|---|---|
| 1064029 | 8/1959 | Fed. Rep. of Germany . |
| 2044893 | 9/1970 | Fed. Rep. of Germany ...... 210/225 |
| 3341636 | 5/1984 | Fed. Rep. of Germany . |
| 3527735 | 2/1986 | Fed. Rep. of Germany . |
| 3640171 | 5/1988 | Fed. Rep. of Germany ...... 210/225 |
| 7019117 | 4/1967 | Japan ................. 210/225 |
| 1-207104 | 8/1989 | Japan ................. 210/225 |
| 2175817 | 12/1986 | United Kingdom . |

Primary Examiner—Robert A. Dawson
Assistant Examiner—Matthew O. Savage
Attorney, Agent, or Firm—Dann, Dorfman, Herrell and Skillman

[57] ABSTRACT

The present invention relates to a method of and apparatus for pressure filtering, the pressure filter (1) used comprising pressure plates (3,4,5,6), which can be pressed against each other. Pressure chambers (8) are formed between the pressure plates and in each one of the pressure chambers two substantially vertical filter cloths are mounted. In order to loosen the filter cakes (32) from the filter cloths (9), means are used to produce sudden acceleration forces, e.g. directly or indirectly acting blow devices (34,36,38) or blow devices or lifting means, cooperating with stop surfaces, which devices and means are designed to drop the guide rails (12) from a lifted position, and/or shear forces, e.g., devices to displace the lower ends of the filter cloths in respectively opposite directions in the planes of the cloths.

14 Claims, 3 Drawing Sheets

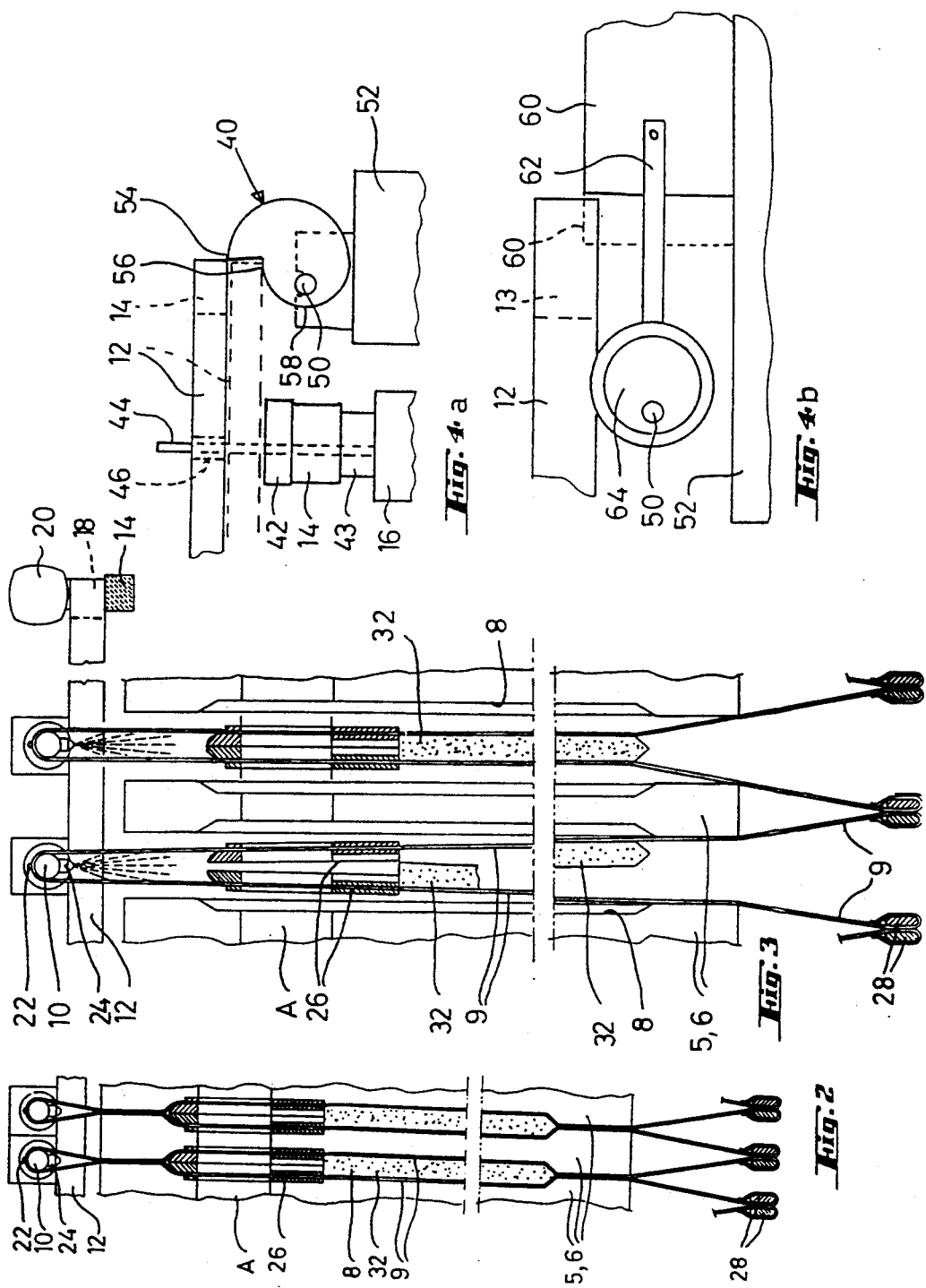

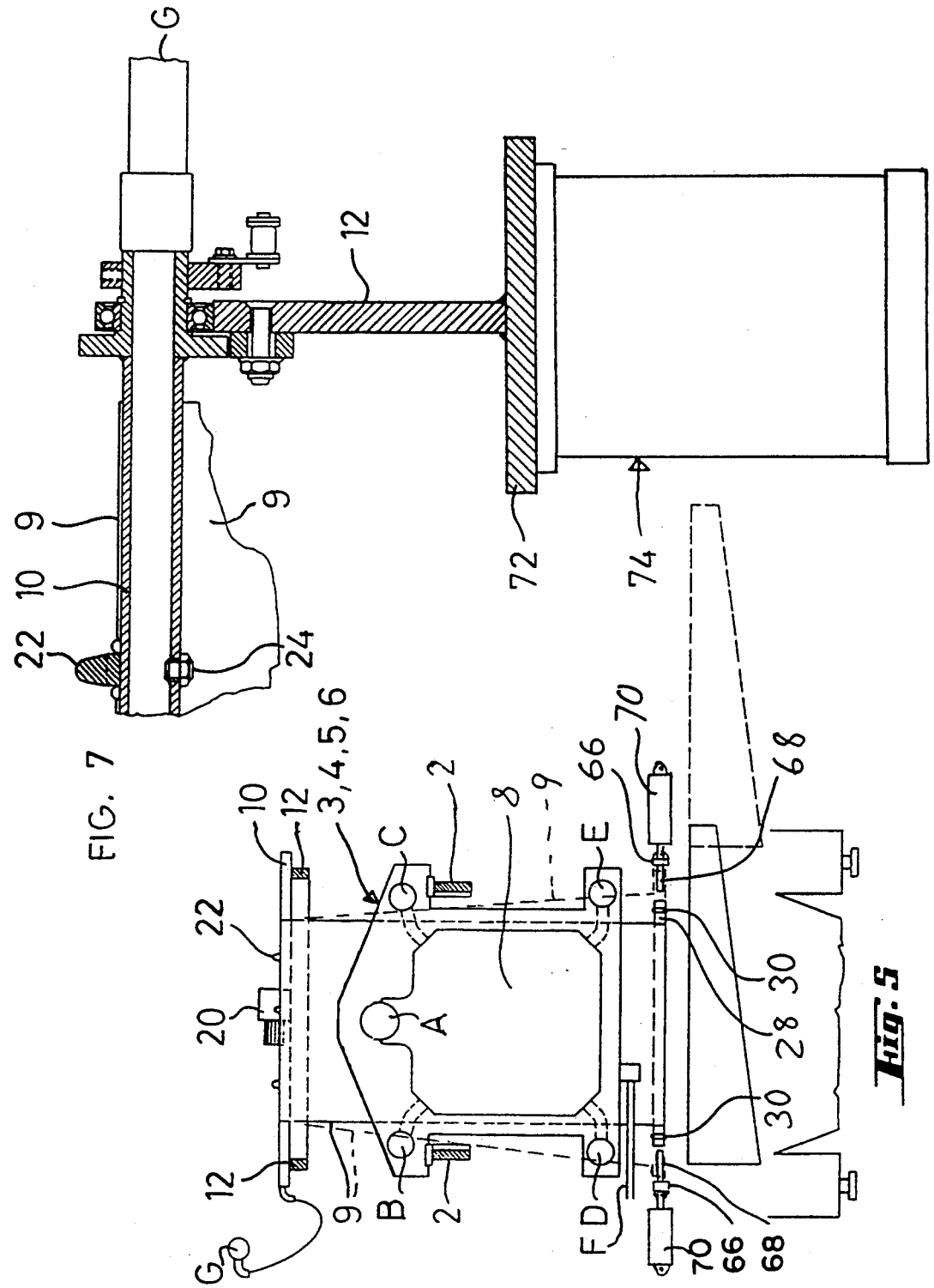

METHOD FOR PRESSURE FILTERING AND DEVICE FOR CARRYING OUT SAME

The present invention relates to a method and means for pressure filtering used to carry out said method according to the preamble of The invention relates particularly to solutions of problems of loosening and discharging the filter cake from such pressure filters. For this purpose it has already been suggested that the filter cloths be subjected to vibrations. DE-C 3 341 636 and DE-A 3 527 735 describe already known pressure filters, in which the filter cloths are suspended from slewing brackets and springs which are raised on the pressure plates. The pressure chambers are opened up one at a time and the filter cake is loosened by means of a movable vibration device, which directly influences the suspension rod of the respective filter cloths. However, these constructions have a drawback. The discharge is very time-consuming, since the filter chambers are emptied one at a time.

In order to empty all the filter chambers simultaneously it is suggested in U.S. Pat. No. 4,900,454, that the suspension rods of the filter cloths be movably suspended in a horizontal direction in the longitudinal direction of the pressure filter on two flexibly or elastically suspended guide rails, which are provided with vibration devices in order to vibrate all of the suspension rods and the corresponding filter cloths at the same time. The positions of the suspension rods when the pressure plates are brought apart are obtained by means of flexible and/or pivotable spacer means fastened to the ends of the suspension rods, which spacer means connect the suspension rods to each other and to the movable gable plates of the pressure filter. Such a pressure filter allows a very fast loosening of the filter cakes from the filter cloths and consequently short filtering cycle times.

This already known pressure filter functions very satisfactorily for most types of materials, with an excellent cake loosening effect. However, as far as certain quite adhering or in other ways difficult to loosen types of materials are concerned vibrations of filter cloths produced in this already known pressure filter are not adequate, since they do not always result in a reliable and complete discharge of the filter cakes. Consequently, portions of or even entire filter cakes may remain in one or several of the filter chambers after a terminated filter cake discharge. Such remaining filter cake portions are particularly found in the upper parts of the filter chambers. This results in an inferior filtering capacity, because during the next filtering cycle portions of the available filter chamber space already are occupied by the remaining filter cake residues. Such remaining filter cake residues usually will remain also during the subsequent filtering cycles and increasingly stick to the walls of the filter chamber, i.e. the filter cloths. Thus, the deterioration of the filtering capacity of the pressure filter will be permanent.

Said remaining filter cake residues can at least be partly removed by spraying a rinsing fluid onto the filter cloths, at least during certain filtering cycles. The filter cake residues will then be brought back to a container or the like for a liquid suspension of filter materials. The filter cake residues which have been loosened by washing will then form a circulating load on the pressure filter, which worsens the filtering capacity of the system. Also, large loosened and washed away filter cake residues may lead to shutdowns and/or other disturbances in the rinsing liquid circulation system.

Due to the above-mentioned drawbacks of already known pressure filters the purpose of the present invention is to suggest a method of efficiently and completely loosening the filter cakes from the filter cloths in the filter chambers during the cake discharge period. An additional purpose of the invention is to suggest a device to carry out said method.

The method according to the present invention advantageously can be combined with a vibration of all of the filter cloths at the same time according to what is set forth in U.S. Pat. No. 4,900,454. The main part of the filter cakes can then be loosened and discharged according to the known method by means of vibrations, while the method according to the present invention is used to loosen possibly remaining filter cake residues.

In a first embodiment of the invention the filter cakes are subjected to shearing forces, because the lower part of the filter cloths are moved laterally in their plane direction. When the filter cloths are moved laterally, folds are formed where the filter cakes or the filter cake residues are located and consequently substantial shearing forces are produced in those parts of the filter cakes located closest to the filter cloths and the filter cakes are loosened from the filter cloths.

According to a second embodiment of the invention the filter cakes are subjected to sudden acceleration forces by lifting the rail guides which support the filter cloths and letting them fall against stationary stops. When the falling filter cloths suddenly are braked particularly the larger remaining residues of the filter cakes are loosened. Thus, this method is principally different from the already known method with vibrations to loosen the filter cakes. Large amounts of remaining filter cake residues have a pronounced suppressing influence on the amplitude of the vibrations. A lower vibration amplitude of course lessens the cake loosening effect of the vibrations.

Also, the vibration amplitude can be different in different parts of the pressure filter. The vibration amplitude can be smaller particularly in the central filter cells due to various damping effects. Such a difference in motion amplitude does not exist when the guide rails are lifted and then fall against stationary stops.

In accordance with another advantageous embodiment of the invention the suspension means of the filter cloths are subjected to blows, preferably in an upward direction, e.g. by means of a blow device and/or a drop hammer, acting directly or indirectly. These blow devices produce an effect, which resembles a lifting and a falling of the guide rails.

According to an additional advantageous embodiment of the invention a presence of possibly remaining filter cakes is detected by means of load sensors, which transmit a signal to the process control unit. The process control unit may be designed, in case remaining filter cake residues are present, to transmit a control signal to start one or several of the above-mentioned cake loosening processes and/or to transmit a warning signal and/or interrupt the filtration process in favor of a manual cleaning. If such a load sensor is used, one may confine oneself to using said above-mentioned cake loosening processes at those occasions when there really are remaining cake residues present. In this way the mechanical stresses on the suspension means of the filter cloths are reduced.

Figure 6:
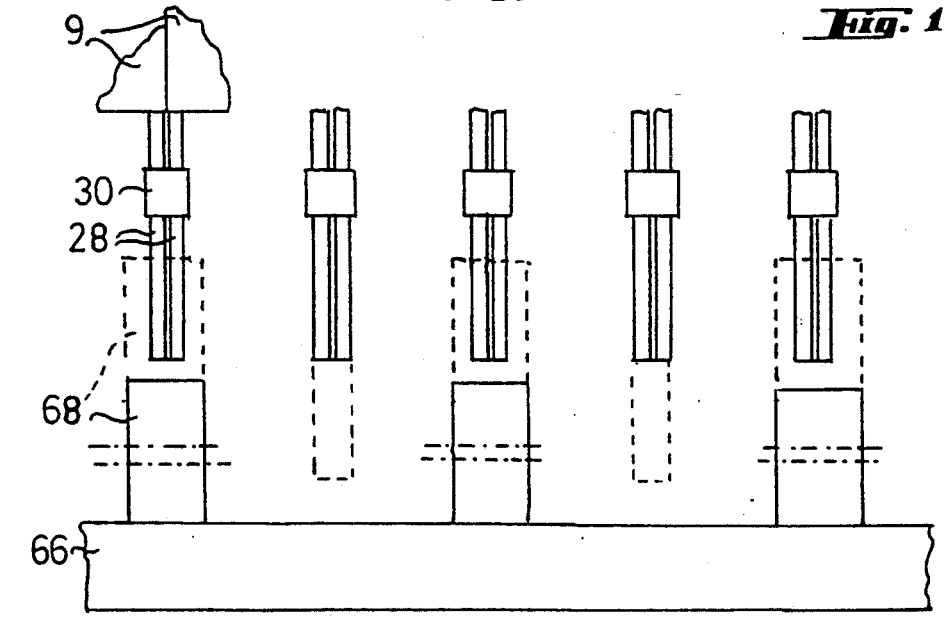

The invention will now be described in more detail by means of a few embodiments, reference being made to the attached, partly schematic drawings, in which:

FIG. 1 shows a pressure filter according to the invention, provided with blow devices;

FIG. 2 a schematic cross section of a pressure filter in a closed position;

FIG. 3 a section which corresponds to FIG. 2 but showing an open position and also showing remaining filter cake residues;

FIG. 4a and 4b a detail of an embodiment showing eccentric lifting devices and stationary stop surfaces;

FIG. 5 a cross section of a filter according to the invention showing means for moving the lower part of the filter cloths;

FIG. 6 a detail of the above-mentioned moving means; and

FIG. 7 a cross section of a guide rail and a blow device fastened to the guide rail.

FIG. 1 shows a pressure filter 1, known per se. This pressure filter corresponds to the pressure filter, which is described in U.S. Pat. No. 4,900,454, reference expressly being made to this specification as regards its design and function, with the exception of those instances which are directly connected with the present invention. The pressure filter comprises mainly a frame 2, which supports a fixed gable plate 3, a movable gable plate 4 and pressure plates 5, 6 arranged between said gable plates. The pressure plates can be pressed against each other and brought apart from each other by means of hydraulic cylinders 7. As shown in U.S. Pat. No. 4,900,454, the pressure plates have drain channels for discharging the filtrate. Pressure plates 3, 4, 5, 6 form in pairs between each other pressure chambers 8, in each of which two filter cloths 9 are placed.

The filter cloths are supported by suspension rods 10, which are movable in a horizontal direction on two flexibly or elasticly supported guide rails 12. The rails are at their two ends supported by flexible or elastic supporting elements 14, e.g. rubber blocks or helical springs. Elements 14 are carried by supports 16, which can comprise separate posts fixed to the floor or a portion of frame 2 or consoles projecting from the frame. Guide rails 12 are connected to each other at their ends by means of transversal yokes 18, which support vibrators 20. The pressure filter is also provided with an inlet conduit A for material and outlet conduits B, C, D, E for filtrate as well as an inlet conduit F for a pressure fluid.

FIG. 2 and 3 show the pressure plates and the filter cloths in detail. Hollow suspension rods 10 are connected to rinsing water inlets G and are provided with upwardly directed positioning ribs 22 and rinsing nozzles 24. The filter cloths are provided with a divisible inlet sleeve 26 and rods 28 inserted in the lower hems. The rods on the respective sides of each pressure plate 5,6 are connected at their ends by rubber bands 30. FIG. 3 illustrates also how residues of filter cake 32 stick to filter cloths 9 in various manners, when the pressure filter is in an open position.

In order to loosen such residues of filter cakes 32, which could not be loosened solely by vibrations, sudden acceleration forces are produced by indirect impact by means of drop hammers 34, 36, which fall from an elevated position onto pivotally mounted arms 38. Arms 38 abut yokes 18 of guide rails 12 with their opposite ends. However, it is also possible to, in other ways, subject suspension means 10, 12 of filter cloths 9 to direct impact preferably upwardly directed blows by means of drop hammers or other types of hammers.

FIG. 4 shows a detail of one end of the guide rails according to another embodiment of the invention, which includes eccentric lifting means 40 and stop surfaces, onto which the guide rails can drop. In this case supports 16 carry a cross bar 42 on top of elastic support elements 14, which cross bar is designed to carry the guide rails when they are in a not lifted position. A vibrator 20 (not shown in FIG. 4) suitably is fastened to the center of the lower side of the cross bar and consequently is protected from blow stresses. Four guide rods 44 project upwardly from cross bars 42 or supports 16 and run through guide sleeves 46 fastened to the guide rails. Between support elements 14 and supports 16 load sensors 43, e.g. pressure transmitters, are mounted, which are connected to the process control unit (not shown) of the pressure filter.

Eccentric lifting means 40 are mounted in pairs on shafts 50 and designed to abut the projecting ends of guide rails 12 or yokes 18 which connect them. They are mounted in an arbitrary way on supports 52 (not shown in detail), e.g. posts erected on the floor. Shafts 50 are designed to be rotated jointly with one or several driving means (not shown in detail), e.g. by means of chain driving or gear motors. Eccentric means 40 are provided with an elevated part 54, from which matching guide rail 12 or yoke part 18 is to drop onto a semi-elevated part 56, which functions as an anvil or stop surface. The lowest part of eccentric lifting means 40 is designed to normally be directed upwardly and then does not abut guide rails 12. The latter are carried by cross bars 42 during the filtration period and during the vibration. When filter cakes are discharged the eccentric lifting means are rotated one revolution, the guide rails being lifted and then dropping. This lifting cycle possibly can be repeated, in case load sensors 43 detect remaining residues of filter cakes 32. In case there are no filter cake residues from the start, the process control unit can transmit a signal that a lifting is not to take place.

FIG. 4b shows an alternative embodiment, in which the ends of the guide rails or the tranversal yokes are designed to fall onto separate movable anvils 60, which are designed to be moved to a position below the ends of the guide rails or the yokes in a lifted position. This can e.g. be accomplished by means of pull rods 62, the other end of which is mounted on eccentric discs 64 on shafts 50. Eccentric discs 64 preferably are placed outside corresponding eccentric lifting means 40 in order not to interfere with them.

FIG. 5 and 6 show a device designed to loosen residues of filter cakes 32 by agitating the filter cloths and in this way produce shearing forces. This device comprises two longitudinal bars 66 and fingers 68, which project therefrom and are positioned just opposite every second pair of rods 28 in the lower hem of filter cloths 9. Said fingers can be pushed towards the ends of the rods by means of e.g. hydraulic cylinders 70 and thus every second cloth pair will be pushed to the right and every second to the left in the figure. Additional control means possibly can be used to move the bars in a longitudinal direction in order to move the lower part of the cloths in an opposite direction. The means which are used to control the ends of rods 28 can according to the invention also be controlled in another way, e.g. manually. This can be done when an alarm signal has been transmitted by load sensors 43 due to remaining filter cake residues in the filter. This device, designed to control the ends of rods 28, advantageously can be combined with the rest of the methods for filter cake loosening described above.

FIG. 7 shows a device according to the invention designed to produce sudden acceleration forces. In this device guide rails 12 are below provided with a transversal reinforcement flange 72. A few blow devices 74, so called "rappers", are attached to this flange and designed to jointly produce blows directed upwards against the guide rails. Such blow devices are already known in screen filters and are used i.a. to loosen adhering material from arched screens and slanting, inoperative screens and in this way to prevent a clogging of the screens.

The present invention is not limited to the illustrated embodiments, but it is possible to combine, in an arbitrary manner, various characterizing features of the invention, as the latter is set forth in the description and the attached drawings and as it is defined in the following patent claims.

We claim:

1. A method of using a pressure filter having pressure plates in pairs forming at least one pressure chamber in which two substantially planar vertical filter cloths are carried by suspension rods movable in a horizontal direction on movably supported guide rails, and means to feed a suspension of solid particles in a liquid under pressure into the pressure chamber and force the liquid through the filter cloths, means for discharging filtered liquid from said chamber, the solid particles remaining between the filter cloths forming a filter cake, including the steps of taking apart the pressure plates, and mechanically agitating the suspension means to loosen the filter cakes from the filter cloths including the additional step of subjecting the cloths to shearing forces by moving the lower part of the filter cloths laterally in the plane direction of the filter cloths.

2. A method according to claim 1, wherein said step of mechanically agitating includes the step of subjecting the suspension means of the filter cloths to blows.

3. A method according to claim 2 wherein said blows are upwardly-directed.

4. A method according to claim 1, including the step of sensing the presence of filter cake residues remaining on the cloths by load sensors responsive to the weight of cloths.

5. A method according to claim 1, wherein all of the filter cloths are vibrated while moving the lower parts of the cloths during the step of mechanically agitating the suspension means to loosen the filter cake.

6. A pressure filter comprising a frame, pressure plates, means to press the plates against each other, means for separating from each other in pairs to form at least one pressure chamber capable of being closed and opened, and two substantially planar vertical filter cloths for forming filter cakes between the cloths in said chamber, suspension means suspending said cloths, movable in a horizontal direction on guide rails, and vibrating means to subject the suspension means to a mechanical agitation when the chamber is opened in order to loosen the filter cakes from the filter cloths said pressure filter including additional means to subject the filter cloths and the filter cakes to shearing forces.

7. A pressure filter according to claim 6, wherein each said filter cloth includes a lower hem part, and a rod in each said hem part, said additional means comprise means for pushing the lower hem parts the lower parts of the filter cloths laterally respectively in opposite directions in the plane of the filter cloths.

8. A pressure filter according to claim 6 including further means to subject the filter cloths and the filter cakes to sudden acceleration forces.

9. A pressure filter according to claim 8, characterized in that said further means comprise blow devices positioned to act on the suspension means to produce sudden acceleration forces.

10. A pressure filter according to claim 9, wherein said blow devices comprise drop hammers acting indirectly on said suspension means.

11. A pressure filter according to claim 9, wherein said blow devices comprise stop surfaces and lifting means operable to lift the suspension means and the filter cloths and to drop the suspension means against the stop surfaces to produce said sudden acceleration forces.

12. A pressure filter according to claim 6, including load sensors detecting any filter cake residues remaining on said cloths.

13. A method of using a pressure filter having pressure plates in pairs forming at least one pressure chamber in which two substantially vertical filter cloths are carried by suspension rods movable in a horizontal direction on movably supported guide rails and means to feed a suspension of solid particle sin a liquid under pressure into the pressure chamber and force the liquid through the filter cloths, means for discharging filtered liquid from said chamber, the solid particles remaining between the filter cloths forming a filter cake, including the steps of taking apart the pressure plates and mechanically agitating the suspension means to loosen the filter cakes from the filter cloths including the additional step of subjecting the cloths to sudden acceleration forces by lifting the guide rails which carry the filter cloths and dropping the rails against stationary stops.

14. A pressure filter having a frame, pressure plates, means to press the plates against each other, means for separating the plates from each other in pairs to form at least one pressure chamber capable of being closed and opened, and two substantially vertical filter cloths for forming filter cakes between the cloths in each chamber, said cloths suspended from suspension means movable in a horizontal direction on guide rails, and vibrating means to subject the suspension means to a mechanical agitation when the chamber is opened in order to loosen the filter cakes from the filter cloths, said pressure filter including further means to subject the filter cloths and the filter cakes to sudden acceleration forces.

* * * * *

UNITED STATES PATENT AND TRADEMARK OFFICE
CERTIFICATE OF CORRECTION

PATENT NO. : 5,133,884

DATED : July 28, 1992

INVENTOR(S) : Mats Carlsson; Torbjorn Jonson

It is certified that error appears in the above-identified patent and that said Letters Patent is hereby corrected as shown below:

Column 1, line 6, after "filtering" insert a period (.) and delete the rest of the line;

line 7, delete in its entirety;

Column 5, line 55, after "for separating" insert --the plates--;

Column 6, lines 8 and 9, delete "the lower parts";

line 34, after "rails" delete "and" and insert --,--.

line 35, "particle sin" should be --particles in--.

Signed and Sealed this

Second Day of November, 1993

*Attest:*

BRUCE LEHMAN

*Attesting Officer*     Commissioner of Patents and Trademarks